US012700404B2

(12) United States Patent
Byrne

(10) Patent No.: US 12,700,404 B2
(45) Date of Patent: Aug. 4, 2026

(54) VOICE COMMAND SELECTION BASED ON CONTEXT INFORMATION

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 467 days.

(21) Appl. No.: 18/305,227

(22) Filed: Apr. 21, 2023

(65) Prior Publication Data

US 2024/0355325 A1    Oct. 24, 2024

(51) Int. Cl.
G10L 15/22 (2006.01)

(52) U.S. Cl.
CPC ........ G10L 15/22 (2013.01); *G10L 2015/223* (2013.01); *G10L 2015/228* (2013.01)

(58) Field of Classification Search
CPC ............... G10L 15/22; G10L 2015/223; G10L 2015/228
See application file for complete search history.

(56) References Cited

U.S. PATENT DOCUMENTS

| | | | | |
|---|---|---|---|---|
| 2007/0265850 A1* | 11/2007 | Kennewick | ......... | G10L 15/1822 |
| | | | | 704/E15.04 |
| 2014/0244259 A1* | 8/2014 | Rosario | ................... | G10L 15/08 |
| | | | | 704/254 |
| 2019/0180757 A1* | 6/2019 | Kothari | ................... | G10L 17/00 |
| 2020/0184962 A1* | 6/2020 | Chen | ........................ | G10L 15/22 |
| 2020/0335100 A1* | 10/2020 | Saon | ....................... | G10L 15/22 |
| 2021/0327410 A1* | 10/2021 | Beaufays | ............ | G06F 3/04883 |
| 2022/0115000 A1* | 4/2022 | Beaufays | .............. | G10L 13/047 |
| 2022/0383859 A1* | 12/2022 | Mimassi | ................. | G10L 15/16 |
| 2023/0215422 A1* | 7/2023 | Carbune | .................. | G06N 3/09 |
| | | | | 704/251 |
| 2024/0233712 A1* | 7/2024 | Abiri | ....................... | G10L 15/16 |

* cited by examiner

*Primary Examiner* — Mark Villena
(74) *Attorney, Agent, or Firm* — Lee & Hayes, P.C.

(57) ABSTRACT

A user equipment (UE), a server, or a combination of a UE and server configured to select a voice command or a wake word decision based on voice input received for the UE, on context information associated with the UE, and on a user profile associating voice commands or wake word decisions with context constraint weights is described herein. The UE, server, or combination also receives the voice input, determines context information related to an activity of the UE, a characteristic of the UE, a location of the UE, or a connection of the UE, and either executes the selected voice command or acts on the wake word decision. As server of the wireless network, connected to the UE, may also be configured to generate default user profiles and provide the UE with one of the default user profiles.

19 Claims, 5 Drawing Sheets

300

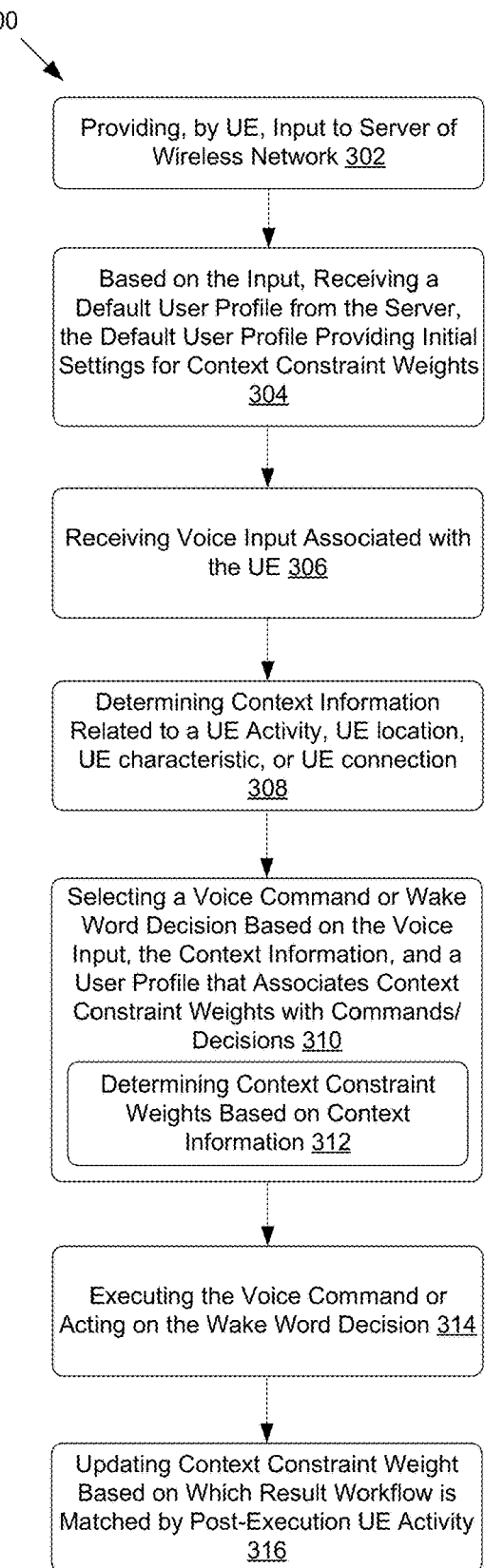

Providing, by UE, Input to Server of Wireless Network 302

Based on the Input, Receiving a Default User Profile from the Server, the Default User Profile Providing Initial Settings for Context Constraint Weights 304

Receiving Voice Input Associated with the UE 306

Determining Context Information Related to a UE Activity, UE location, UE characteristic, or UE connection 308

Selecting a Voice Command or Wake Word Decision Based on the Voice Input, the Context Information, and a User Profile that Associates Context Constraint Weights with Commands/ Decisions 310

Determining Context Constraint Weights Based on Context Information 312

Executing the Voice Command or Acting on the Wake Word Decision 314

Updating Context Constraint Weight Based on Which Result Workflow is Matched by Post-Execution UE Activity 316

FIG. 3

400

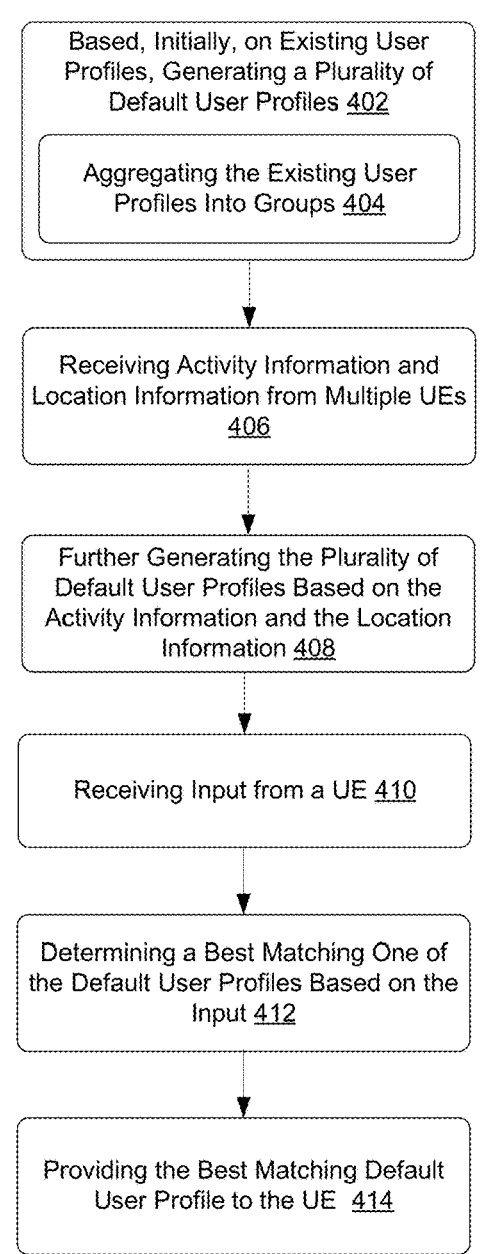

Based, Initially, on Existing User Profiles, Generating a Plurality of Default User Profiles 402

Aggregating the Existing User Profiles Into Groups 404

Receiving Activity Information and Location Information from Multiple UEs 406

Further Generating the Plurality of Default User Profiles Based on the Activity Information and the Location Information 408

Receiving Input from a UE 410

Determining a Best Matching One of the Default User Profiles Based on the Input 412

Providing the Best Matching Default User Profile to the UE 414

FIG. 4

VOICE COMMAND SELECTION BASED ON CONTEXT INFORMATION

BACKGROUND

Many phones, tablet computers, connected watches, and augmented reality/virtual reality (AR/VR) goggles have voice commend capabilities. These devices, referred to in wireless communication technologies as user equipment (UE), can capture voice commands responsive to physical activation of a control or speaking of a wake word. Upon activation, UEs capture and process voice input and determine a voice command to execute based on that input. For example, if a user says "text", a text box user interface (UI) may be activated. If a user says, "call Joe", the UE may initiate a voice all to a contact identified as "Joe" on the UE. Some voice commands sound alike, however, leading to the UE executing the voice command. Also, in some environments, the UE may have difficulty hearing the user speak a wake word. These challenges have impaired the user experience of voice command interfaces and slowed their adoption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 shows a flowchart of an example method in which a UE receives voice input, determines context information associated with, e.g., UE activities, selects a voice command or a wake word decision based on the voice input, the context information, and a user profile, and executes the voice command or acts on the wake word decision.

FIG. 4 shows a flowchart of an example method in which a server of a wireless network connected to a UE generates default user profiles based on activity information and location information of multiple UEs, determines a best matching default user profile for a specific UE based on input from that UE, and provides that best matching default user profile to the specific UE.

DETAILED DESCRIPTION

Figure 1:
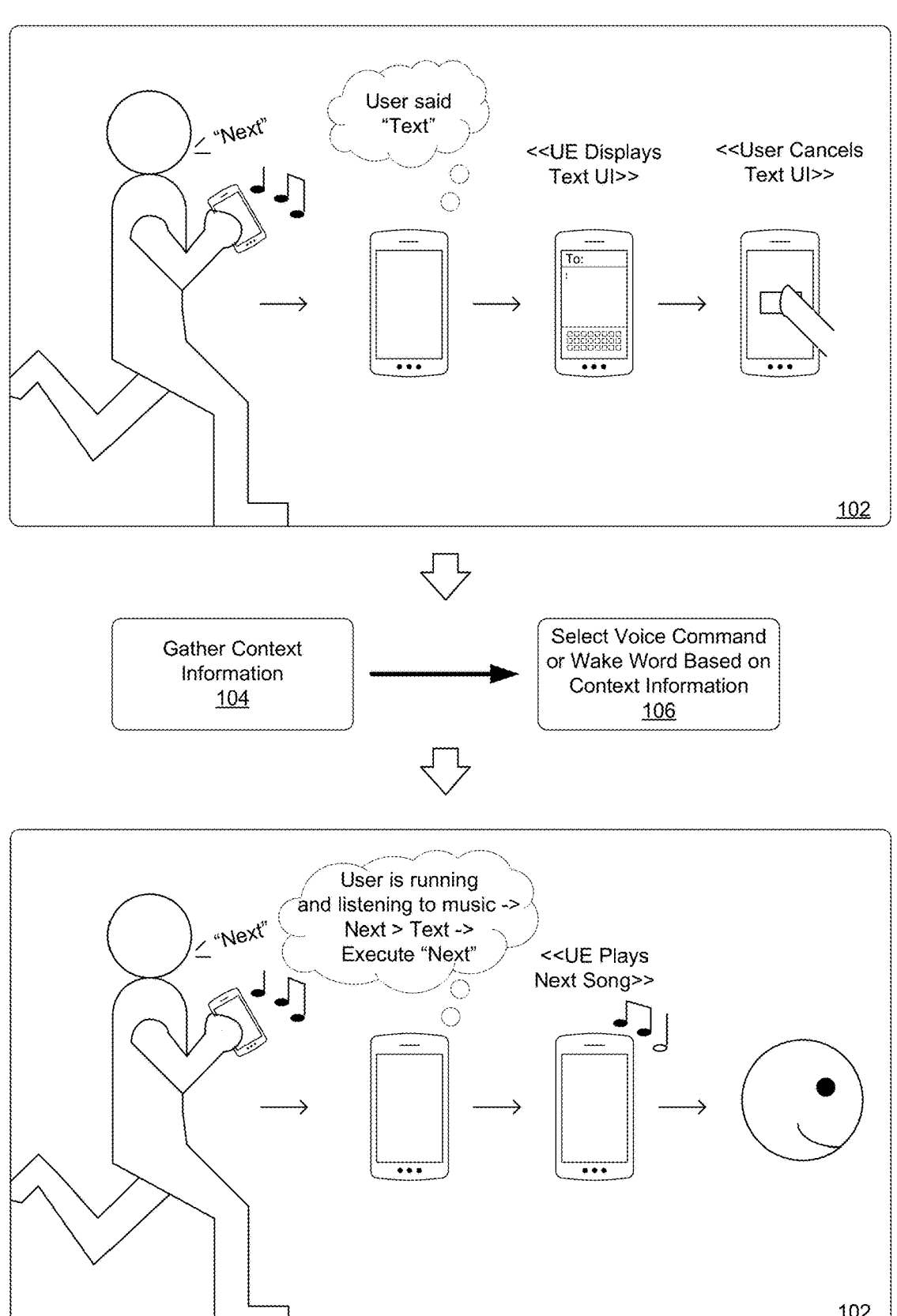
FIG. 1 shows example use cases involving selection of a voice command or a wake word decision with and without context information.

This disclosure describes a device configured to select a voice command or a wake word decision based on voice input received for a UE, on context information associated with the UE, and on a user profile associating voice commands or wake word decisions with context constraint weights. The device also receives the voice input, determines context information related to an activity of the UE, a characteristic of the UE, a location of the UE, or a connection of the UE, and either executes the selected voice command or acts on the wake word decision. Additionally, a server of the wireless network, connected to the device or serving as the device, may be configured to generate default user profiles and provide the device with one of the default user profiles.

As used above and elsewhere herein, "device" refers to a UE, a server, or a combination of a UE and a server to determine context information for a UE and select a voice command or wake word decision for the UE. The "device" may be the UE that receives the voice input, context information and executes the voice command/acts on the wake word decision or another device performing some or all of the processing on the UE's behalf. When the "device" is a server or includes a server, that server may be the same server that provides a default user profile or a different server.

In various implementations, the device may start with a default user profile, which may be specific to a UE or to a group of UEs similar in some respect, or may be a generic default UE. The default user profile may include context constraint weights that may be adjusted and added to through machine learning, based on context information and results of executing voice commands or taking action on wake word decisions. When voice input associated with a UE is received, the device determines context information for that UE. Such context information can include at least one of a UE location, identities of applications currently active on the UE, network connections between the UE and at least one of the Internet or social media, UE motion data, environmental data from at least one of a microphone of the UE or a camera of the UE, a user calendar, or identities of communication partners of the UE. The device then determines context constraint weights of the user profile based on the context information. The user profile may be the default user profile or an updated version of the default user profile, learned over time. Based on those determine context constraint weights, the device selects a voice command or wake word decision and associated with the voice input executes the voice command or acts on the wake word decision. The device then updates the user profile based on whether results of the voice command/wake word decision match a positive result workflow or a negative result workflow, either increasing context constraint weight(s) or decreasing them.

In some implementations, a server of a wireless network determines a best matching default user profile for the device and provides that best matching user profile to the device. In some examples, the server may perform some or all of the functionality of the device. In other examples, a UE or different server may perform some or all of the functionality of the device and receive the default user profile. The server of the wireless network may select the best matching default user profile based on input from the device. Such input may be similar to or the same as the context information. In addition to the input, the server may consider information available to the wireless network, such as identities of subscribers on a same subscription plan as the UE associated with the voice input, devices associated with that subscription plan, features of the subscription plan, etc. The server may also generate multiple default user profiles. It may do so based on receiving user profiles from multiple UEs and aggregating those user profiles into similar groups. It may also or instead receive activity and location information from UEs and/or the device and generate or update default user profiles based on that information.

In some examples, a user of a UE may be watching TV, at a concert, or in some other environment with a lot of background noise. In such an environment, the UE may have a difficult time detecting user speech. And even when user speech is detected, it may be too indistinct to trigger a voice command module of the UE. The user may speak her wake word but the UE may not activate the voice command module. To address this challenge, a user profile can include a context constraint weight that biases the UE towards treating the indistinct voice input as the wake word. This context constraint weight could in turn be associated with context information, such as the volume of sound detected by a microphone of the UE, an application used by the UE, a volume setting of the UE, etc. After the wake word decision is made, the subsequent activity of the UE can be used to adjust the context constraint weights. If the wake word decision for voice input is that it is not a wake word and the wake word is then detected seconds later, that may indicate the earlier decision was incorrect. The context constraint weight for detecting the wake word (also referred to as the "wake word sensitivity") may then be increased. If, on the other hand, the wake word decision for the voice input is that it is a wake word and the UE quickly cancels out of a UE associated with the voice command module, the detection of the wake word may be deemed a false positive and the context constraint weight for it may be decreased. These context constraint weights may not only be associated with context information, but with specific measures of context information (e.g., a specific volume). Thus, the user profile including the context constraint weights may have multiple context constraint weights associated with volume detected by a microphone of the UE, each with a different measure of that volume.

Another example is illustrated in FIG. 1. FIG. 1 shows, at 102, a user running with a UE and listening to music. The user speaks the command "next", intending to go to a next track or song. The voice input, however, is interpreted as "text" and a text UI is displayed on the UE, forcing the user to cancel out of that UI. Implementations discussed herein can address the difficulties depicted at 102 by determining, at 104, context information associated with the UE and selecting, at 106, a voice command based on the context information (e.g., through the use of a user profile). The result is depicted at 108: the user running with the UE and listening to music speaks "next" and the voice command "next" is executed, transitioning the music to the next track or song and producing a positive user experience.

Example Environment

Figure 2:
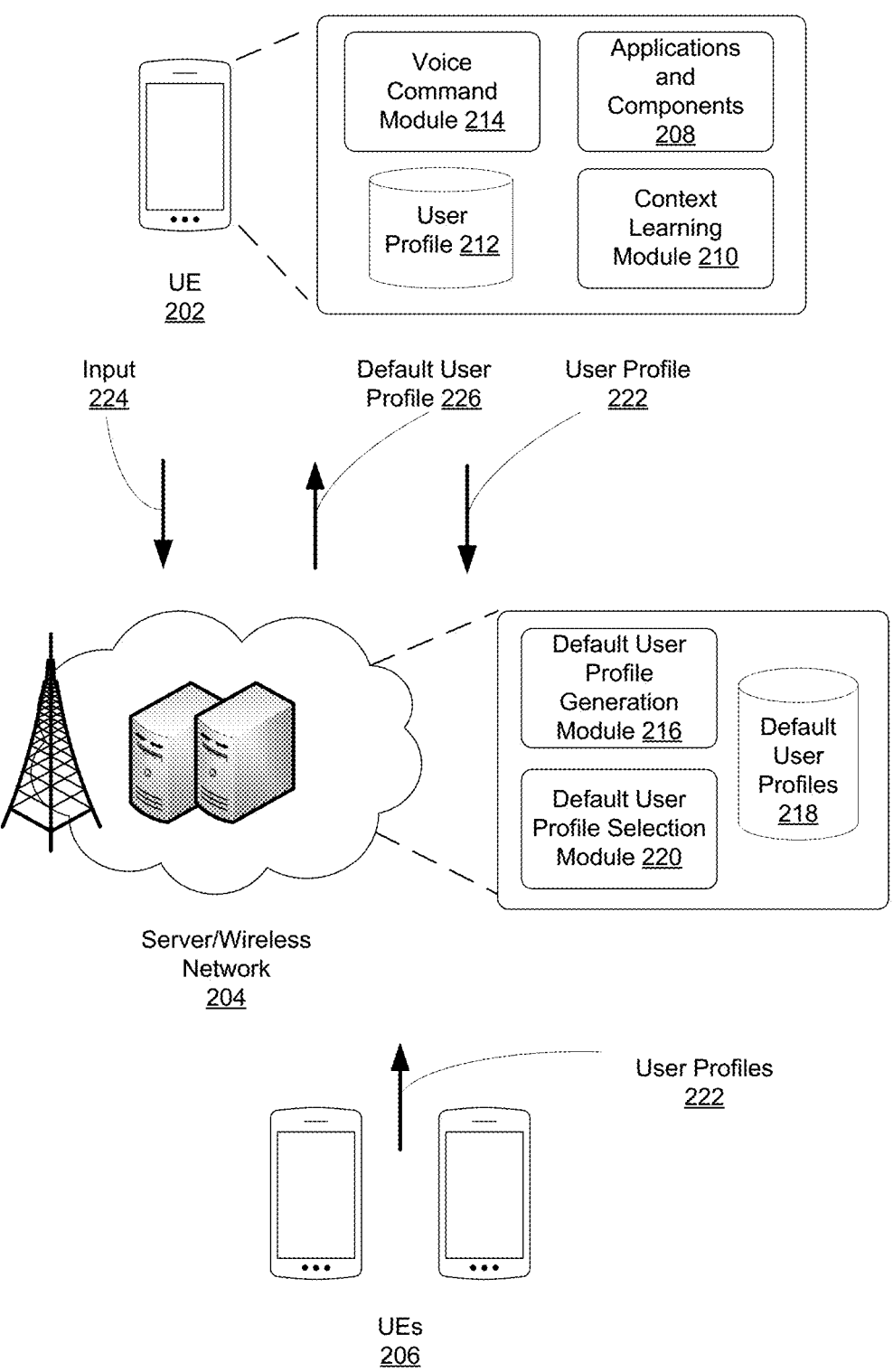
FIG. 2 shows an example of a network environment including a UE connected to a server through a wireless network, the UE receiving a default user profile from the server and using that default user profile, context information, and voice input received by the UE to select a voice command or a wake word decision.

FIG. 2 shows an example of a network environment including a UE connected to a server through a wireless network, the UE receiving a default user profile from the server and using that default user profile, context information, and voice input received by the UE to select a voice command or a wake word decision. As illustrated, a UE 202 may be connected to a server/wireless network 204, which may in turn be connected to additional UEs 206. The UE 202 may have applications/components 208 and be configured with a context learning module 210, user profile 212, and voice command module 214. The server/wireless network 204 may be configured with a default user profile generating module 216, default user profiles 218, and a default user profile selection module 220. Also, the server/wireless network 204 may receive, at 222, user profiles, and receive, at 224, input from the UE 202. In response to the input, the server/wireless network 204 may provide, at 226, a default user profile.

As indicated herein, the determination of context information and selection of voice commands or wake word decisions may be performed by any of a UE, a server, or a combination of a UE and a server. For purposes of illustration and discussion, that determination and selection are performed, in FIG. 2, by UE 202. It is to be understood, however, that part or all of those operations could be performed by a server, such as server 204 or a different server, or by a combination of UE 202 and a server.

Figure 5:
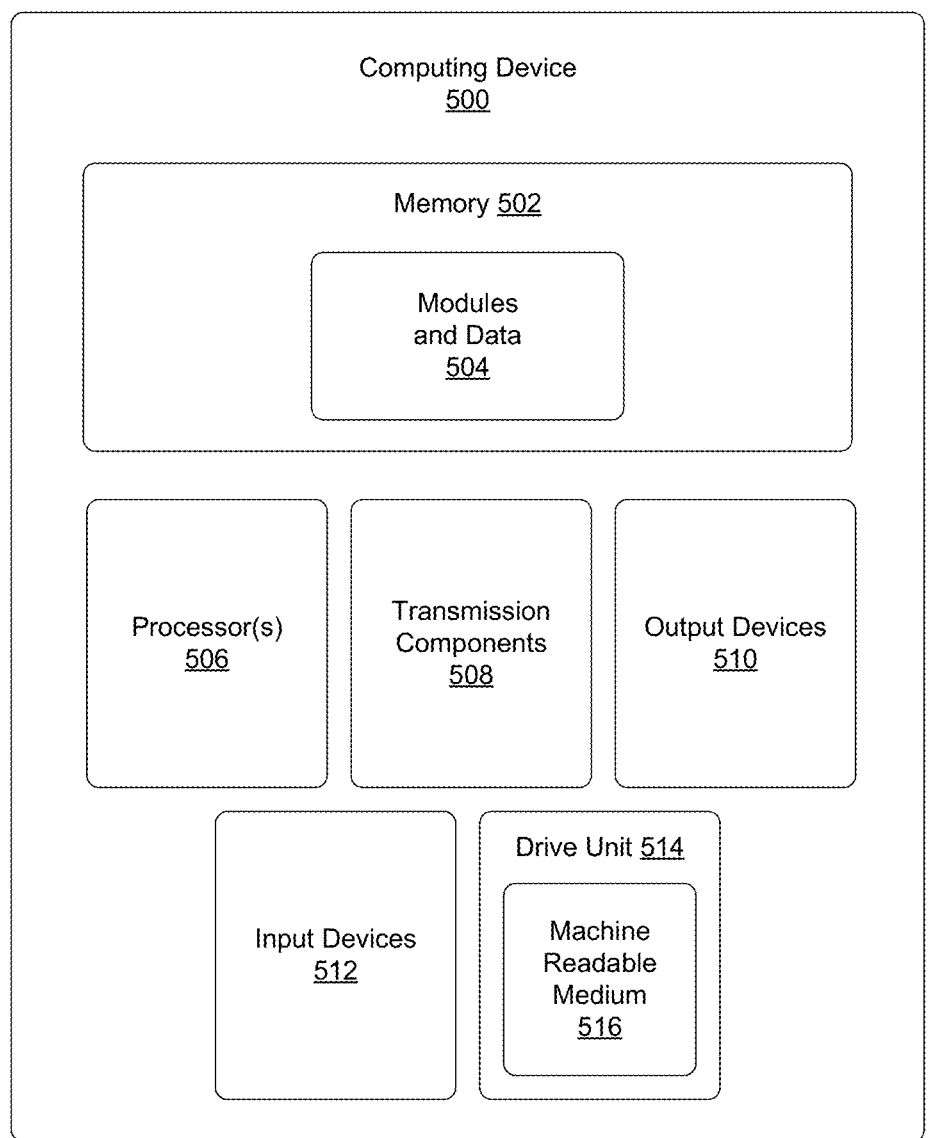
FIG. 5 shows an example of a computing device capable of implementing a UE or a server of wireless network.

In various implementations, the UE 202 can be any device that can wirelessly connect to a base station or access point, such as a base station or access point associated with the server/wireless network 204. In some examples, the UE 202 can be a mobile phone, such as a smart phone or other cellular phone. In other examples, the UE 202 can be a personal digital assistant (PDA), a media player, a tablet computer, a gaming device, a smart watch, a hotspot, an Internet of Things (IoT) device, a wearable device, an XR device, an AR/VR device, a personal computer (PC) such as a laptop, desktop, or workstation, or any other type of computing or communication device. An example of a system architecture of a computing device capable of implementing the UE 202 is illustrated in FIG. 5 and described herein with reference to that figure.

The server/wireless network 204 may include both a wireless access network and network, such as a core network of a telecommunications network or a public network, e.g. the Internet, connecting that wireless access network to other networks and devices of the network(s), such as devices/servers of a base station or core network. Such servers/devices may be PCs, server computers, mainframes, laptops, desktops, workstations, etc. An example of a system architecture of a computing device capable of implementing a server 204 is illustrated in FIG. 5 and described herein with reference to that figure.

In some implementations, the UE 202 and elements of the server/wireless network 204 can be compatible with one or more radio access technologies, wireless access technologies, protocols, and/or standards. For example, the UE 202 and elements of the server/wireless network 204 can support Fifth Generation (5G) new radio (NR) technology, Long-Term Evolution (LTE)/LTE Advanced technology, High-Speed Data Packet Access (HSDPA)/Evolved High-Speed Packet Access (HSPA+) technology, other fourth generation (4G) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

As an example, the server/wireless network 204 can be or include a gNodeB (gNB) of a 5G access network. As another example, the access network can be an LTE access network, known as an Evolved UMTS Terrestrial Radio Access Network (E-UTRAN), and the server/wireless network 204 can be or include an evolved Node B (eNB) of the LTE access network. A core network of the server/wireless network 204 can also be based on LTE or 5G. For instance, the core network can be a 5G core network or an LTE packet core network known as an Evolved Packet Core (EPC). A base station and the core network of the server/wireless network 204 may be based on the same radio access technology, or different radio access technologies. For instance, in some examples the base station can be a 5G gNB that is linked to an LTE core network and/or a 5G core network.

The core network may be an EPC and can include nodes such as a Home Subscriber Server (HSS), Mobility Management Entity (MME), and Policy and Charging Rules Function (PCRF). Alternatively, the core network may be a 5G core network can includes nodes such as a Unified Data Management (UDM) node, an Access and Mobility Management Function (AMF), and a Policy Control Function (PCF). The core network can include an Internet Protocol Multimedia Subsystem (IMS) or be connected to one and can further include gateway devices for access to external networks, such as the Internet, and external services. Such core network or IMS nodes could include or implement functionality of the server/wireless network 204.

FIG. 2 also depicts UEs 206. Such UEs 206 may also each be configured with components and data 208-214 and may be the same type of device as UE 202.

In various implementations, the applications/components 208 represent all applications, characteristics, locations, and connections of the UE 202. A non-exhaustive list of examples includes location sensing components (e.g., a global positioning system (GPS) sensor), applications currently active on the UE, network connections between the UE and at least one of the Internet or social media, UE motion sensing components, input components and their interfaces (e.g., a microphone of the UE 202 or a camera of the UE 202), a user calendar, or user contact lists. Such applications/components 208 may include interfaces making information about them accessible. For example, an operating system of the UE 202 may include an interface that enables querying for a list of currently executing applications.

The additional modules and data shown for UE 202 in FIG. 2—the context learning module 210, user profile 212, and voice command module 214—illustrate one configuration of modules and data. The functionality and contents of the context learning module 210, user profile 212, and voice command module 214 can be distributed or consolidated in any configuration of modules and data.

In some implementations, the context learning module 210 may generate or update the user profile 212 and determine context information. It identifies context constraint weights, in light of current context information, to the voice command module 214 and receives success or failure feedback from the voice command module 214. It can add, delete, and set context constraint weights in the user profile 212 based on context information. It can receive/retrieve information from applications/components 208 and determine context information. And it can provide, at 222, its user profile 212 to server/wireless network 204, provide, at 204, input to the server/wireless network 204, and receive, at 226, a default user profile to form the basis of user profile 212.

The context learning module 210 initially receives a default user profile as user profile 212. The default user profile may be a generic profile configured on the UE 202 or it may, as shown in FIG. 2, be received, at 226, from server/wireless network 204 responsive to the context learning module 210 providing input, at 224. Such input may be any information available on the UE 202, such as a device type, a device capability, a subscription plan type, a list of applications or services, etc. The default user profile provided by the server/wireless network 204, at 226, may be one of a plurality of default user profiles generated by the server/wireless network 204 for different groups of UEs. As described herein, the server/wireless network 204 provides a best matching one of these default user profiles, at 226. Th provided default user profile may have context constraint weights that better match the characteristics of the UE 202 than a generic default user profile that could be, e.g., the same for all UEs. From time to time, or upon request from the server/wireless network 204, the context learning module 210 may also provide, at 222, the user profile 212 to the server/wireless network 204 for use by the server/wireless network 204 in generating further/updated default user profiles.

In various implementations, when voice input is received at the UE 202, the context learning module 210 receives or retrieves context information. As noted herein, such context information is any information that can be queried or provided by the application/components 208. Examples of context information include a location of the UE 202 (e.g., from GPS), identities of applications 208 currently active on the UE 202, network connections between the UE 202 and at least one of the Internet or social media, motion data of the UE 202, environmental data from at least one of a microphone of the UE 202 or a camera of the UE 202, a user calendar, or identities of communication partners of the UE 202. N some examples, the context learning module 210 may also receive candidate voice commands from the voice command module 214, either with notice of the voice input or separately. Context constraint weights associated with each candidate voice command are determined from the user profile 212 and are narrowed/selected by the context learning module 210 based on the context information. In other examples, a wake word decision flag is sent along with the voice input or separate from it. The context learning module 210 then retrieves context constraint weights from the user profile 212 for the wake word decision flag and, based on the context information, context constraint weights favoring one decision or another are selected. In some implementations, the context learning module 210 then returns the context constraint weights or a decision for a candidate voice command or selection of a wake word decision to the voice command module 214.

Upon execution of the voice command or acting on the wake word decision, some actions may or may not be taken on the UE 202. For example, the UE 202 may expect further voice input in the form of voice commands, but the user may be silent or may cancel out of a voice command UI. These actions may indicate that the wake word decision or voice command selection just acted on/executed were incorrect. In another example, the UE 202 may expect a user to listen to playback or a track or song following execution of the voice command "next", and the user may behave consistently with this expectation. These patterns of behavior associated with success or failure may match successful result workflows or failed result workflows associated with voice commands/wake word decisions, and the voice command module 214, when noting a match with a result workflow, can send an indicate of success/failure to the context learning module 210 to associate with the selected context constraint weights. In some implementations, then, the context learning module 210 can increase or decrease the context constraint weights in the user profile 212 based on the indications of success failure. If a context constraint weight contributed to selection of an incorrect voice command, for instance, its weight may be decreased.

The context learning module 210 may also track how often a context constraint weight for a candidate voice command is used over a time period. One that is unused or used less than a threshold number of times may be deleted. In contrast, the context learning module 210 may add a new context constraint weight to the user profile 212 based on context information and, as that context constraint is repeatedly selected and positive results are obtained of the voice command/wake word decision, the value for that context constraint weight is increased.

In some implementations, the user profile may be any sort of data structure or database. It may be the output of machine learning techniques implemented by the context learning module 210 and may be updated through addition and removal of context criteria weights and adjustment of those context criteria weights. The context criteria weights may in turn be associated with voice commands and context information such that given the context information and magnitude of the context criteria weights, associated voice commands are more likely to be selected. Likewise, context criteria weights may be associated wake word decisions and context information such that given context information and context criteria weighs, a given wake word decision is more or less likely.

In various implementations, the voice command module 214 may receive voice input and determine, using language processing techniques, whether the voice input is associated with a voice command or whether the voice input is a wake word. In making this determination, the voice command module 214 may receive and utilize context constraint weights from the user profile 212 provided by the context learning module 210. In other implementations, the voice command module 214 may provide candidate voice commands to the context learning module 210 and receive a selection of a voice command in return. Once the voice command module 214 has selected a voice command or made a wake word decision (or received such a selection/decision), the voice command module 214 executes the voice command or acts on the wake word decision. The voice command module 214 may then monitor UE activity and determine whether it meets a successful result workflow or a failed result workflow and inform the context learning module 210 of the result.

In some implementations the default user profile (DUP) generating module 216 receives user profiles at 222 and generates DUPs 218 from those user profiles. The DUP generating module 216 may request user profiles from UEs 202/206 periodically or on an event driven basis or may receive, unsolicited, the user profiles at 222 on a periodic or event driven basis. Once received, the DUP generating module 216 may aggregate the user profiles into a number of groups based on similarities and differences among the user profiles. The number of groups may be preset or determined based on the similarities and differences presented. Once aggregated into groups, a representative or synthesized DUP 218 for each group may be selected/created. A synthesized DUP 218 could be generated, for example, by retaining all context constraint weights with a threshold magnitude or higher and, when context constraint weights conflict, selecting the context constraint weight with the highest magnitude.

The DUP generating module 216 may also generate a DUP 218 for a UE 202 based on the user profiles 212 of those sharing a subscription plan with the user of UE 202 or those sharing some other trait or traits with the user of UE 202 (e.g., location, employer, common interests, common background, etc.). In such circumstances, aggregating may be based on those commonalities rather than on similarities of the user profiles themselves. The process for generating a DUP 218 from a group of user profiles may be the same, however.

In other implementations, the DUP generating module 216 may simply receive DUPs 218 from a server of the wireless network 204—which may be the same as server 204 or a different server. The server may use machine learning to generate DUPs 218 based on observing behavior and characteristics of UEs at scale over the wireless network 204.

Further, the DUP generating module 216 may generate DUPs 218 based on activity information and location information received from UEs 202/206. Such information could be provided in addition to user profiles or in place of them and could be used to update user profiles before aggregating, update the DUPs 218 after aggregating, or to generate the DUPs 218 when no user profiles (or sparse user profiles) are provided.

The DUPs 218 may be data structures or databases and similar to or same as the user profile 212, except in many examples for different context constraint weights (in either or both of identities of those weights or magnitude of those weights).

In various implementations, the DUP selection module 220 receives input at 224 from the UE 202, selects a DUP 218 for the UE 202 based on the input, and, at 226, provides the DUP 218 to the UE 202. The input provided at 224 may be similar to or the same as the context information. In addition to the input, the DUP selection module 220 may consider information available to the wireless network 204, such as identities of subscribers on a same subscription plan as the UE 202, devices associated with that subscription plan, features of the subscription plan, etc. The DUP selection module 220 compares the input and other information to the DUPs 218 and, upon finding a best matching DUP 218, provides the best matching DUP 218 to the UE 202 at 226.

Example Operations

FIGS. 3 and 4 illustrate example processes. These processes are each illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 shows a flowchart of an example method in which a UE receives voice input, determines context information associated with, e.g., UE activities, selects a voice command or a wake word decision based on the voice input, the context information, and a user profile, and executes the voice command or acts on the wake word decision. At 302, a device provides input to a server of a wireless network, such as a server associated with an operator of the wireless network. The device may be a UE, a server or access point of the wireless network, or a combination of the UE and the server or access point.

At 304, in response to providing the input, the device receives a default user profile from the server of the wireless network. The default user profile provides initial settings for context constraint weights of a user profile associated with the device. In some implementations, alternatively to or in addition to the receiving the default user profile, the user profile may be created by a machine learning module of the device.

At 306, the device receives voice input associated with the UE.

At 308, the device determines context information related to an activity of the UE, a characteristic of the UE, a location of the UE, or a connection of the UE. The context information may include at least one of a UE location, identities of applications currently active on the UE, network connections between the UE and at least one of the Internet or social media, UE motion data, environmental data from at least one of a microphone of the UE or a camera of the UE, a user calendar, or identities of communication partners of the UE. In some implementations, the activity, the characteristic, the location, or the connection is a predicted activity, predicted characteristic, predicted presence at the location, or predicted connection that the context information suggests will occur or will not occur.

At 310, the device selects a voice command or a wake word decision based on the voice input, the context information, and the user profile. The user profile associates voice commands or wake word decisions with the context constraint weights. At 312, the selecting includes determining the context constraint weights based on the context information.

At 314, the device executes the voice command or acts on the wake word decision.

At 316, the device updates the context constraint weights based on whether UE activity after executing the voice command or acting on the wake word decision matches a positive result workflow or a negative result workflow for the voice command or the wake word decision. In some implementations, the updating may be performed by a machine learning module of the device.

FIG. 4 shows a flowchart of an example method in which a server of a wireless network connected to a UE generates default user profiles based on activity information and location information of multiple UEs, determines a best matching default user profile for a specific UE based on input from that UE, and provides that best matching default user profile to the specific UE. At 402, the server initially generates a plurality of default user profiles for voice command modules of multiple UEs based on existing user profiles. At 404, the initially generating includes aggregating the existing user profiles into groups.

At 406, the server receives activity information and location information from the multiple UEs. The activity information or location information may include at least one of a location of one of the UEs, identities of applications currently active on one of the UEs, network connections between one of the UEs and at least one of the Internet or social media, UE motion data of one of the UEs, environmental data from at least one of a microphone of one of the UEs or a camera of one of the UEs, a user calendar of one of the UEs, or identities of communication partners of one of the UEs.

At 408, the server further generates the plurality of default user profiles based on the activity information and the location information.

At 410, the server receives input from a UE.

At 412, the server determines a best matching default user profile from the plurality of default user profiles based on the input. Determining the best matching default user profile may be based on identities of members of a subscription plan associated with the UE.

At 414, the server provides the determined best matching default user profile to the UE.

Example Architectures

FIG. 5 shows an example of a computing device 500 capable of implementing a UE 202 or a server 204 of wireless network. The computing device 500 can have at least one memory 502 storing modules and data 504, processor(s) 506, one or more transmission components 508, output devices 510, input devices 512, and/or a drive unit 514 including a machine readable medium 516.

In various examples, the memory 502 can include system memory, which may be volatile (such as RAM), non-volatile (such as ROM, flash memory, etc.) or some combination of the two. The memory 502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the computing device 500. Any such non-transitory computer-readable media may be part of the computing device 500.

The memory 502 can include one or more software or firmware elements, such as computer-readable instructions that are executable by the one or more processors 506. For example, the memory 502 can store computer-executable instructions such as modules and data 504. The modules and data 504 can include a platform, operating system, applications, and data utilized by the platform, operating system, and applications. When the computing device 500 is a UE, such as UE 202, the computing device 500 may further include applications and components 208, a context learning module 210, a user profile 212, and a voice command module 214. These modules and data 208-214 may also be include when the computing device 500 is a server and the server implements all or part of the functionality described herein with respect to UE 202. When the computing device 500 is a server 204, the computing device 500 may further include a default user profile generating module 216, default user profiles 218, and a default user profile selection module 220.

In various examples, the processor(s) 506 can be a CPU, a graphics processing unit (GPU), or both CPU and GPU, or any other type of processing unit. Each of the one or more processor(s) 506 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 506 may also be responsible for executing all computer applications stored in the memory 502, which can be associated with types of volatile (RAM) and/or nonvolatile (ROM) memory.

The transmission components 508 can include transceivers, modems, interfaces, antennas, and/or other components that perform or assist in exchanging RF communications or wired communications with base stations, Wi-Fi access points, UEs, or servers or otherwise implement connections with one or more networks. The transmission components 508 can be compatible with one or more radio access technologies, such as 5G NR radio access technologies and/or LTE radio access technologies.

The output devices 510 can include any sort of output devices known in the art, such as a display, speakers, a vibrating mechanism, and/or a tactile feedback mechanism.

Output devices 510 can also include ports for one or more peripheral devices, such as headphones, peripheral speakers, and/or a peripheral display.

The input devices 512 can include any sort of input devices known in the art. For example, input devices 512 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 516 of a drive unit 514 can store one or more sets of instructions, such as software or firmware, that embodies any one or more of the methodologies or functions described herein. The instructions can also reside, completely or at least partially, within the memory 502, processor(s) 506, and/or transmission components 508 during execution thereof by the computing device 500.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method comprising:
receiving voice input associated with a user equipment (UE);
determining context information for the UE, wherein the context information includes at least one of environmental data from at least one of a microphone of the UE or a camera of the UE or UE motion data;
selecting a voice command or a wake word decision based on the voice input, the context information, and a user profile associating voice commands or wake word decisions with context constraint weights; and
executing the voice command or acting on the wake word decision,
wherein the user profile is a best matching default user profile determined from a plurality of default user profiles based on identities of members of a subscription plan associated with the UE.

2. The computer-implemented method of claim 1, wherein the selecting includes determining the context constraint weights based on the context information.

3. The computer-implemented method of claim 1, further comprising receiving the best matching default user profile from a server of a wireless network, the best matching default user profile providing initial settings for the context constraint weights.

4. The computer-implemented method of claim 3, further comprising providing input to the server and receiving the best matching default user profile based at least in part on the input.

5. The computer-implemented method of claim 1, wherein the context information further includes at least one of a UE location, identities of applications currently active on the UE, network connections between the UE and at least one of the Internet or social media, a user calendar, or identities of communication partners of the UE.

6. The computer-implemented method of claim 1, wherein the context information relates to a predicted activity, a predicted characteristic, a predicted presence at a location, or a predicted connection that the context information suggests will occur or will not occur.

7. The computer-implemented method of claim 1, wherein the receiving, the determining, and the selecting are performed by the UE, by a server or access point of a wireless network, or by a combination of the UE and the server or access point.

8. The computer-implemented method of claim 1, further comprising updating the context constraint weights based on whether UE activity after executing the voice command or acting on the wake word decision matches a correct selection result workflow or an incorrect selection result workflow for the voice command or the wake word decision.

9. The computer-implemented method of claim 8, wherein the user profile is created by a machine learning module of the UE, the machine learning module performing the updating.

10. A user equipment (UE) comprising:
a processor;
a voice command module configured to be operated by the processor to interpret voice input from a user of the UE as a voice command to the UE or as a wake word;
a user profile associated with the voice command module and including context constraint weights that effect selection of the voice command or a wake word decision; and
a plurality of programming instructions configured to be operated by the processor to perform operations including:
receiving voice input;
determining context information for the UE, wherein the context information includes at least one of environmental data from at least one of a microphone of the UE or a camera of the UE or UE motion data;
selecting the voice command or the wake word decision based on the voice input, the context information, and the user profile associating voice commands or wake word decisions with the context constraint weights; and
executing the voice command or acting on the wake word decision,
wherein the user profile is a best matching default user profile determined from a plurality of default user profiles based on identities of members of a subscription plan associated with the UE.

11. The UE of claim 10, wherein the selecting includes determining the context constraint weights based on the context information.

12. The UE of claim 10, wherein the operations further include updating the context constraint weights based on whether UE activity after executing the voice command or acting on the wake word decision matches a correct selection result workflow or an incorrect selection result workflow for the voice command or the wake word decision.

13. The UE of claim 10, wherein the best matching default user profile provides initial settings for the context constraint weights.

14. The UE of claim 13, wherein the operations further include providing input to a server and receiving the best matching default user profile based at least in part on the input.

15. The UE of claim 10, wherein the context information further includes at least one of a UE location, identities of applications currently active on the UE, network connections between the UE and at least one of the Internet or social media, a user calendar, or identities of communication partners of the UE.

16. A non-transitory computer-readable medium having a plurality of programming instructions stored thereon that, when executed by one or more processors, cause the one or more processors to perform operations comprising:

receiving activity information and location information from multiple user equipments (UEs);

generating a plurality of default user profiles for voice command modules of the multiple UEs based on the activity information and the location information;

receiving input from a UE, wherein the input includes at least one of UE motion data of the UE or environmental data from at least one of a microphone of the UE or a camera of the UE;

determining a best matching default user profile from the plurality of default user profiles based on the input, wherein determining the best matching default user profile is based on identities of members of a subscription plan associated with the UE; and providing the determined best matching default user profile to the UE.

17. The non-transitory computer-readable medium of claim 16, wherein the operations include generating the plurality of default user profiles based, initially, on existing user profiles.

18. The non-transitory computer-readable medium of claim 17, wherein generating the plurality of default user profiles based, initially, on existing user profiles includes aggregating the existing user profiles into groups.

19. The non-transitory computer-readable medium of claim 16, wherein the activity information or location information includes at least one of a location of one of the UEs, identities of applications currently active on one of the UEs, network connections between one of the UEs and at least one of the Internet or social media, UE motion data of one of the UEs, environmental data from at least one of a microphone of one of the UEs or a camera of one of the UEs, a user calendar of one of the UEs, or identities of communication partners of one of the UEs.

* * * * *